Feb. 22, 1938.   C. S. HAZARD   2,109,352
AUTOMATIC ZEROIZER FOR DISPENSING PUMPS
Filed June 2, 1936
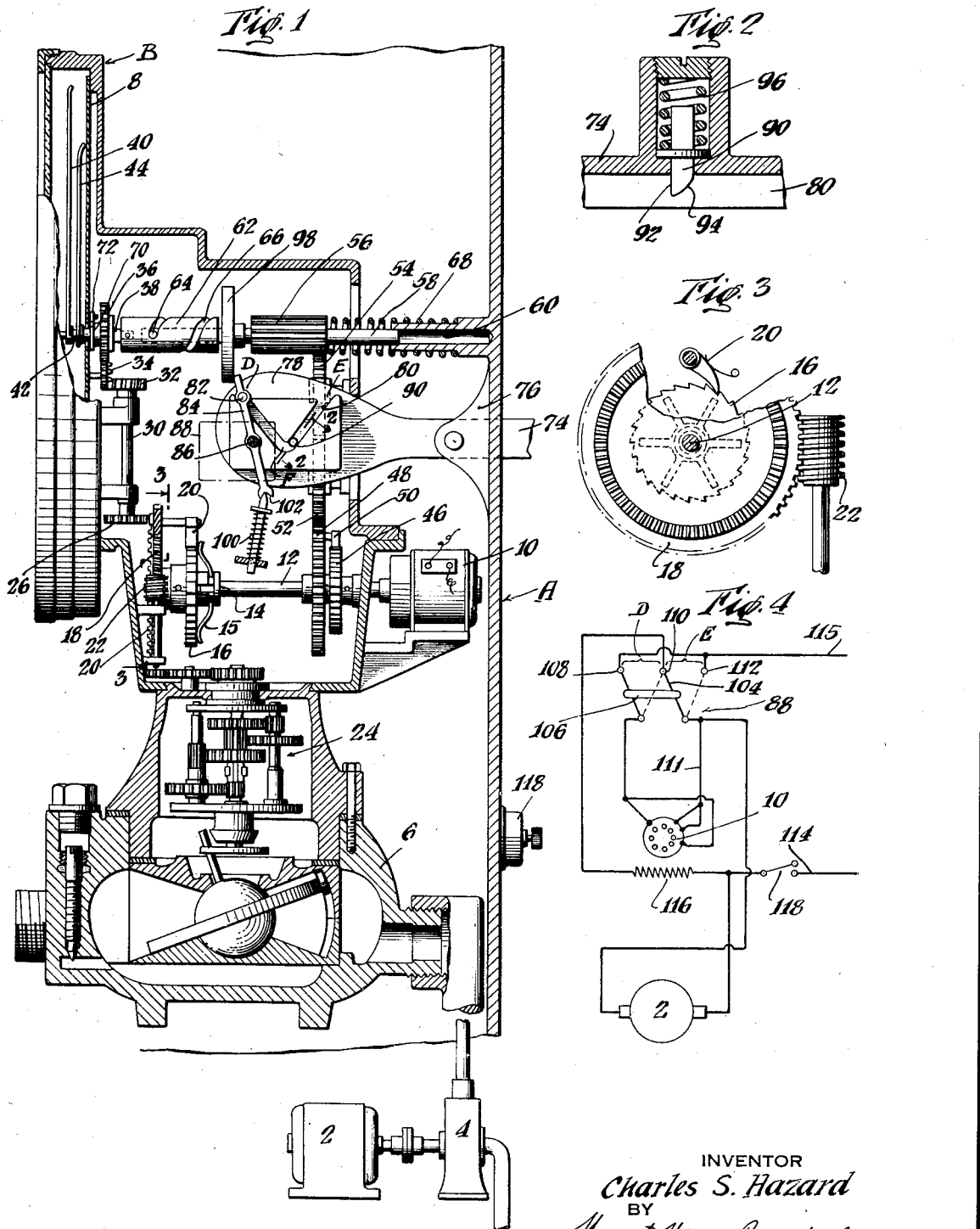
INVENTOR
Charles S. Hazard
BY
ATTORNEYS Patented Feb. 22, 1938

2,109,352

UNITED STATES PATENT OFFICE 2,109,352

AUTOMATIC ZEROIZER FOR DISPENSING PUMP

Charles S. Hazard, New York, N. Y., assignor to Neptune Meter Company, a corporation of New Jersey Application June 2, 1936, Serial No. 83,029

17 Claims. (Cl. 221—95)

The present invention is directed to operating and control mechanisms for dispensing pumps and the like, and as hereinafter described, is particularly applicable to pumps of the type used in gasoline filling stations.

Dispensing pumps of this character usually include a motor operated pump, a meter for measuring the amount of liquid dispensed, and an indicator actuated by the meter. The indicator is ordinarily designed to be reset prior to each dispensing operation and automatically operating resetting means are sometimes used in order to insure the resetting of the indicator to zero and proper indication of the amount of liquid dispensed in each separate transaction. In some constructions also the indicator or registering device used is complicated and imposes a load upon the meter due to the power required to actuate the same.

In accordance with the present invention, means are provided for supplying energy to operate the register as well as to reset the register automatically prior to each dispensing operation, and a single source of power may be used for supplying the energy necessary for both of these operations. Furthermore, the invention may embody control means actuated as an incident to the dispensing operation to insure resetting of the indicator to zero prior to the operation of either the indicator or the pump or other liquid supply means employed.

Any suitable source of power may be used for actuating the indicator and for resetting the same, but in the preferred form of the invention hereinafter described, a reversible motor is used for this purpose. The motor when driven in one direction serves to drive the indicator under the control of a liquid meter, and when driven in the opposite direction actuates mechanism for resetting the indicator to zero.

In accordance with the present invention, the device may also include novel means for reversing the motor which operates in a predetermined manner, first to cause the indicator to be reset to zero and thereafter to reverse the motor and initiate operation of the dispensing means and drive the indicator under control of the meter.

The automatic operation of the apparatus effectually prevents fraudulent or inadvertently improper operation of the device, since the sequence of operations cannot be altered by the operator. Thus, the invention provides a simple construction which operates in a positive manner to assure both the customer and the operator that the amount of liquid indicated by the register is an accurate measure of the amount of liquid dispensed.

For a better understanding of the present invention, reference may be had to the accompanying drawing, in which:

Figure 1 is a view in elevation, partly broken away, of a typical form of apparatus embodying the invention;

Figure 2 is a sectional view of a latch element taken on line 2—2 of Figure 1;

Figure 3 is a view taken on line 3—3 of Figure 1 of a detail of a pawl and ratchet and clutch, and Figure 4 is a diagrammatic view of the electrical connections provided for the apparatus of Figure 1.

The form of apparatus herein shown embodying the invention comprises a housing and a framework indicated generally as A, in which is mounted a motor 2 and a pump 4 (diagrammatically shown), which may be of any conventional type adapted to deliver liquid from a suitable source (not shown), to a meter 6. From the meter the liquid may be dispensed through the usual dispensing hose, (not shown).

The indicator B mounted in the housing includes a dial 8, and pointers 40 and 44 which are actuated by a reversible motor 10 under the control of meter 6, to indicate the amount of liquid dispensed. The motor 10 is also supported in the housing, and is provided with a shaft 12 having a hub 14 secured thereto, and provided with spring fingers 15 which frictionally engage the face of a ratchet member 16 to drive the same. A gear 18 rotatably mounted on the shaft 12 adjacent the ratchet member 16 is provided with a spring-urged pawl 20 engaging the teeth of the ratchet member 16 to drive the gear 18 when the shaft 12 and member 16 are driven in one direction by the motor.

The gear 18 is formed on its periphery with teeth for engagement with worm gear 22 which is driven by the meter 6 through the reduction gears 24 and serves to control the speed at which the gear 18 is driven by the motor. The gear 18 is also provided with spur teeth on the face thereof for engagement with the gear 26 for driving the indicator under control of the meter.

The construction described, including worm gear 22 and gear 18, forms an irreversible connection such that the worm gear 22 controls the operation or movement of the motor driven gear 18, but the gear 18 cannot drive the worm 22 or the meter. A dispensing apparatus comprising a construction of this type is disclosed and claimed in the copending application of William L. Marden, Serial Number 51,980, filed November 29, 1935.

The construction described permits operation of the indicator by the motor in one direction only, due to the driving connection through ratchet member 16. However, the speed of operation of the indicator is controlled by the meter, although the motor may be driven at higher speed due to the slip connection provided by the spring fingers 15 engaging the face of the ratchet member 16. The spur teeth of the gear 18 engage the gear 26 to drive the same. The latter is secured to a shaft 30 on the upper end of which is secured a gear 32 meshing with crown gear 34 provided with peripheral teeth for driving the gear 36 and shaft 38 to which the indicator pointer 40 is secured. Gear 36 is frictionally clutched to shaft 38 in order that the indicator hand 40 may be reset to zero position.

The connections between the meter 6 and the gear 36 are so proportioned that the gear 36 and pointer 40 are caused to make one complete rotation for each gallon, or other unit of liquid, passing through the meter in the dispensing operation. Suitable connections (not shown) may also be provided between the shaft 38, and a shaft 42 carrying a second pointer 44 to cause the pointer 44 to be advanced one interval upon every complete rotation of the pointer 40. A suitable clutch and pickup mechanism may be provided between the mechanisms for rotating the pointers so that they may be returned to zero position by rotation together. The pointer 40 therefore indicates the fractions of a gallon dispensed whereas, the pointer 44 indicates the number of gallons dispensed in each operation.

During the dispensing operation, these parts will operate as described, and the indicator will move in one direction. However, the indicator should be reset prior to a succeeding dispensing operation, in order that each transaction may be indicated separately. This is accomplished by rotation of the motor in the opposite direction from that in which it rotates in driving the indicator. For this purpose, the shaft 12 is provided with a ratchet member 46, the ratchet teeth of which extend in a direction opposite to those of the ratchet member 16. The gear 48 is rotatably mounted on the shaft 12, adjacent the ratchet member 46, and is provided with a pawl 50 for engagement with the teeth of the ratchet member 46 to drive the gear 48 when the motor is driven in the opposite direction.

As gear 48 is rotated it drives idler gears 52 and 54, the latter meshing with a barrel gear 56, fixed to shaft 58. Shaft 58 is axially shiftable in a bearing 60 on frame A and in a sleeve 62 fixed to indicator shaft 38. Shaft 58 carries at its left hand end as viewed in Fig. 1, a pin 64 slidable in a spiral slot 66 in sleeve 62 upon relative rotation between shaft 58 and sleeve 62. The pin 64 is normally retained at the left hand end of slot 64 by a spring 68, and sleeve 62 and shaft 58 are therefore rotated together when the indicator is being returned to zero, by proper directional rotation of motor 10. In order to stop the indicator hands 40 and 44 at zero position, shaft 38 carries a fixed single tooth ratchet 70 which is engageable with a pawl 72 mounted on the frame A when the hands reach zero position thus preventing further rotation of shaft 38 and sleeve 62. As the motor 10 continues to drive shaft 58, the pin 64 will travel to the right along spiral slot 66 until the direction of operation of motor 10 is reversed.

A construction similar in certain respects to that described above, and including a motor driven resetting means for the indicator which is adapted to be disengaged from the indicator upon continued operation of the motor after the indicator has been reset, is described and claimed in my copending application, Serial Number 83,030, filed June 2, 1936.

In order to control the starting, stopping and reversal of the motor 10, in an automatic manner, the apparatus utilizes the hose support 74, pivotally mounted in lugs 76 on the frame A as a convenient master control. It will be understood that other manually actuated means may be used as a control means for the purpose of my invention, but I have illustrated the mechanism as including an enlarged inner end 78 on the hose support 74 in which a substantially triangular shaped cam track 80 is provided. Cam track 80 receives a roller 82 mounted upon a switch actuating arm 84 which through shaft 86 moves the switch blades contained in switch block 88 to any one of three positions in accordance with a predetermined sequence of movements of switch arm 84. The sequence of the movements is determined by the position of roller 82 in the cam track 80 which is in turn determined by the position of the hose support 74.

When the hose is on the support, its inner end 78 is raised and the roller 82 rests in the lower end of the cam track 80 at position F. In this position the switch is open and the pump motor 2 and reversible motor 10 are inoperative. When the hose is removed from the support its inner end 78 may be lowered and the roller 82 is then directed to the upper left hand end D of the cam track 80 by latch 90 disposed in the cam track. The latch 90 is provided with a perpendicular face 92 directed towards the left-hand branch of the cam track 80 and an inclined face 94 directed toward the right hand branch of cam track 80, the latch 90 being urged into the cam track 80 by a spring 96. With the roller 82 in the position D shown in Fig. 1, the switch 88 is closed to actuate motor 10 in the proper direction to return the indicator hands 40 and 44 towards their zero position, but pump motor 2 is not energized. When the indicator reaches zero, as previously described the shaft 58 is displaced to the right by relative rotation between sleeve 62 and shaft 58, moving disc 98 fixed thereto, also to the right into engagement with switch arm 84. Continued displacement of disc 98 moves roller 82 and switch arm 84 to the right into position E at the upper end of the right hand branch of cam track 80. In position E, the switch 88 reverses the direction of rotation of motor 10 and energizes pump motor 2, so that a dispensing operation can take place. The motor 10 will then rotate in the proper direction to drive the indicator hand in accordance with the flow of liquid through meter 6, as previously described. In order to aid the switch arm 84 in its movement from position D to position E, a spring-actuated toggle 100 is pivotally mounted on the frame A and engages a bifurcated end 102 on switch arm 84, so that upon movement of arm 84 past dead center from position D, toggle 100 will snap it to position E. The switch arm will then be retained in position E until moved therefrom by upward movement of the inner end of the hose support.

When a dispensing operation is completed return of the hose to the support 74 raises end 78 of the support and roller 82 moves along the right hand branch of cam track 80, to position F. Latch 90 is depressed as roller 82 passes over the same, and thereafter snaps back to its projected position preventing movement of the roller from the position F to the position E when the inner end of the hose support is again depressed. The mechanism is thus restored to its original "off" position.

In order to control the sequence of operations described from switch 88 the circuit of Fig. 4 may be used. Referring to Fig. 4, the switch 88 is provided with two pivoted switch blades 104 and 106 and three contacts 108, 110 and 112, the contacts and blades being so spaced that only the center contact 110 and one of the outer contacts 108 or 112 can be engaged simultaneously by blades 106 and 104. In position D of the switch operating arm 84 previously described, the blades 104 and 106 of the switch engage contacts 110 and 108 respectively as shown in full lines in the drawing in which motor 10 is rotated in one direction. Position E of the operating arm previously described corresponds to the dotted line positions of Fig. 4, with blades 106 and 104 engaging contacts 110 and 112, respectively, wherein the motor 10 is rotated in the opposite direction and pump motor 2 is actuated. In position F, the blades 104 and 106 are disposed between and out of engagement with contacts 108, 110 and 112, and both motors 2 and 10 are inactive.

One line 114 of a source of electrical energy is connected to one terminal of pump motor 2, and through resistance 116 to contact 110. The opposite line 115 is connected to contacts 108 and 112. The opposite terminal of motor 2 is connected to switch blade 104 and to one terminal of reversing motor 10. The opposite terminal of motor 10 is connected to switch blade 106. The power line 114 may have a master switch 118 therein for opening and closing the circuit.

With the switch 88 in position D shown in full lines in Fig. 4, current flows from line 114 through master switch 118 and resistance 116 to central contact 110 and thence through conductor 111 to the motor 10. From the opposite side of the motor current passes through switch blade 106 to contact 108 and to the opposite side 115 of the line. Motor 10 is thus driven in one direction while the motor 2 is inoperative since both sides thereof are connected to the line 114.

When the switch 88 is moved to position E, the current passes from line 114 and master switch 118 through motor 2 to switch blade 104 and contact 112 to the opposite sides 115 of the line, energizing motor 2. At the same time, current passes through resistance 116 to contact 110 and switch blade 106 and thence through motor 10, and conductor 111 to blade 104 and contact 112 to the opposite side 115 of the line. The direction of current flow through motor 10 is thus reversed from that when in position D, and the direction of rotation of motor 10 is also reversed.

When the switch operating arm 84 is in the position F and the inner end of the hose support raised, the switch 88 is open and blade 104 is between contacts 110 and 112 while switch blade 106 is between contacts 108 and 110.

In operation, assuming the hose to be suspended from support 74, switch 88 in position F, and master switch 118 open; the pump 4 and motor 2 are not operating and reversing motor 10 is stationary. Switch 118 may be then closed, and upon removal of the hose from the support 74, end 78 of the support may be raised so that switch roller 82 is directed by latch 90 into the left-hand branch of cam track 80 to position D, starting motor 6 in the proper direction to reset hands 40 and 44 to zero. Rotation of the motor is transmitted through ratchet 46 and pawl 50 to gears 48, 50 and 52 to barrel gear 56 and shaft 58. Pin 64 being at the left-hand end of the slot in sleeve 62 rotates the sleeve and shaft 38 to move hands 40 and 44, returning them toward zero. At the same time pawl 20 and ratchet 18 disengage permitting free rotation of shaft 12 and hub 14 with respect to worm 22 and worm gear 18.

When pawl 72 on the dial of indicator B is engaged by the tooth of ratchet 70 on shaft 38 at zero position of the indicator B, the sleeve 62 is locked against further rotation, but the motor 10 continues to rotate shaft 58 causing pin 64 to travel along spiral slot 66 against the action of spring 68 displacing the shaft 58 and disk 98 to the right as viewed in Fig. 1. As the disk 98 moves it contacts with the end of switch operating arm 84 displacing it to the right against the biasing effect of spring pressed pin 100, until arm 84 passes dead center. Pin 100 then snaps switch arm 84 and roller 82 to position E, thereby reversing the direction of rotation of motor 10 terminating the resetting operation and driving gear 18 under control of meter 4. At the same time the circuit for energizing the pump motor 2 is completed, whereupon the pump 4 is actuated and a dispensing operation may take place.

As liquid is pumped through meter 6, the gear train 24 is driven, rotating worm 22. Reversal of motor 6 disengages pawl 50 from ratchet 46 and engages pawl 20 with ratchet 16. The indicator hand is thus free to be driven by motor 10 while spring 68 returns pin 64 to its initial position at the end of spiral slot 66 in sleeve 62 as shown in Fig. 1.

Motor 10 acting through shaft 12 and friction clutch 16, 18 drives the indicator hand 40 and 44. Slippage between the clutch elements 16 and 18 permits a differential in speed between motor 10 and worm gear 18, the latter being permitted to rotate only in accordance with the speed of operation of the meter 2, since the worm 22 driven by meter 6, acts as a controller. The motor 10, thus supplies substantially all of the power for driving the indicator B, relieving meter 2 from the load of the indicator B and rendering its operation more accurate.

Return of the hose to the support 74, moves the switch arm 84 to position F, opening the switch 88 and stopping both the pump 4 and the reversing motor 10. Switch 118 may then be turned to "off" position to prevent accidental operation of the dispensing device.

It will be understood that the preceding description is illustrative only of my invention, and that there can be many variations in the elements thereof, all falling within the scope of my invention as defined in the following claims:

I claim:

1. In a liquid dispensing device, the combination of a meter, an indicator movable away from an initial position in proportion to the quantity of liquid dispensed, means for actuating the indicator in response to operation of the meter, means for resetting the indicator to said initial position, means for alternately operating the indicator actuating means and the resetting means and means actuated upon movement of the indicator to initial position for rendering the resetting means inoperative and the indicator actuating means operative.

2. In a liquid dispensing device, a meter for measuring the liquid dispensed, an indicator controlled by said meter, a motor, means actuated by said motor for sequentially driving said indicator under control of said meter during a dispensing operation and for driving said indicator independently of said meter to reset the indicator to zero, and means actuated upon movement of the indicator to zero for terminating a resetting operation.

3. In a liquid dispensing device, the combination of a meter for measuring liquid, an indicator movable away from an initial position in proportion to the quantity of liquid dispensed, a motor, means actuated by the motor for resetting the indicator to said initial position, and means actuated by the motor and rendered operative by return of the indicator to initial position for driving the indicator under the control of the meter to indicate the quantity of liquid dispensed.

4. In a liquid dispensing device, the combination of a meter, an indicator movable away from an initial position in proportion to the quantity of liquid dispensed, means for actuating the indicator in response to operation of a meter and for resetting the indicator to said initial position, and means for controlling the indicator actuating and resetting means to condition the indicator actuating and resetting means for a resetting operation at the conclusion of a dispensing operation and for conditioning the indicator actuating and resetting means for actuating the indicator in response to the operation of the meter during a dispensing operation at the conclusion of a resetting operation.

5. In a liquid dispensing device, a meter for measuring the liquid dispensed, indicating means controlled by said meter movable to indicate the amount of liquid dispensed, a motor, a driving connection between said motor and indicating means for actuating the indicating means during a dispensing operation, another driving connection between said motor and indicator for resetting said indicating means to zero, and means actuated by the motor after the conclusion of a resetting operation for rendering the resetting connection inoperative and the indicator actuating connection operative.

6. In a liquid dispensing device, a meter for measuring the amount of liquid dispensed, an indicator controlled by said meter, a motor, a one-way driving connection between said motor and indicator for driving the indicator in one direction during a dispensing operation, a one-way driving connection between said motor and indicator for resetting the indicator, and means actuated after the conclusion of a resetting operation for rendering the indicator driving connection operative.

7. In a liquid dispensing device, a meter, an indicator operable in response to the operation of said meter, reversible drive means, means actuated by said drive means upon operation thereof in one direction for actuating said indicator under control of said meter during a dispensing operation, other means actuated by said drive means upon operation thereof in the opposite direction to reset said indicator to zero, and means controlling the reversible drive means for terminating operation of the drive means at the conclusion of a dispensing operation and conditioning the drive means for operation only in the opposite direction.

8. In a liquid dispensing device, a meter, an indicator operable in response to the operation of said meter, reversible drive means, means actuated by said drive means upon operation thereof in one direction for actuating said indicator under control of said meter, and other means actuated by said drive means upon operation thereof in the opposite direction to reset said indicator to zero, and means actuated upon movement of said indicator to zero for reversing the direction of operation of said drive means.

9. In a liquid dispensing device, a meter actuated by liquid flow, an indicator controlled by the meter for registering the quantity of liquid dispensed, a reversible motor connected to the indicator, control means for the motor displaceable to a plurality of positions, means for displacing the control means to one position to initiate operation of the motor to reset the indicator to zero, and means actuated by the motor and operable only when the indicator is at zero, to displace the control means to another position to reverse said motor.

10. In a liquid dispensing device, a meter actuated by liquid flow, an indicator controlled by the meter for registering the quantity of liquid dispensed, a motor reversible in direction of operation, first means connecting the motor to the indicator to supply additional power for operating the indicator, second means connecting the motor to the indicator to reset the latter to zero, said first means being operative, and said second means being inoperative in one direction of operation of the motor, and said first means being inoperative and said second means being operative in the opposite direction of operation of the motor, and means for reversing the direction of operation of the motor, and means actuated in response to return of the indicator to zero for actuating the control means to cause the motor to drive the indicator during a dispensing operation.

11. In a liquid dispensing device, an indicator, a liquid operated meter, first means for driving the indicator during a dispensing operation in accordance with the operation of the meter, second means for resetting the indicator to zero, and means for controlling the first and second means to render the second means operative until the indicator is reset to zero and actuated by return of the indicator to zero to render the second means inoperative and the first means operative.

12. In a liquid dispensing device, an indicator, a liquid operated meter, first means for actuating the indicator in accordance with the operation of the meter, second means for resetting the indicator to zero, driving means for said first and second means, and means controlling the operation of said driving means to cause the latter to drive the second means until the indicator is reset to zero, and in response to return of the indicator to zero to drive the first means.

13. In a liquid dispensing device, an indicator, a liquid operated meter, first means for driving the indicator in accordance with the operation of the meter, second means for resetting the indicator to zero, driving means for said first and second means, means for initiating operation of said driving means to reset the indicator to zero, and means actuated by the driving means when the indicator reaches zero, to render said second means inoperative, and said first means operative.

14. In a liquid dispensing device, an indicator, a meter responsive to liquid flow, means controlled by the meter for moving the indicator away from an initial position in accordance with the quantity of liquid passing through the meter, means for returning the indicator to initial position, means for successively actuating the indicator moving and returning means, a hose support, control means associated with the hose support for initiating operation of the actuating means to first reset the indicator to zero, and upon return of the indicator to initial position to actuate the indicator moving means.

15. In a liquid dispensing device, liquid pumping means, a meter for measuring the fluid dispensed, an indicator for registering the quantity of fluid dispensed, a reversible motor, means including a pawl and ratchet connecting the motor to the indicator and meter and operative in one direction of operation only to drive the indicator, means including a pawl and ratchet connecting the motor to the indicator and operative in the other direction of operation only to reset the indicator to zero, and means controlling the pumping means and the direction of operation of the motor to reverse the direction of operation of the latter after the indicator has been reset to zero and to initiate operation of the pumping means.

16. In a liquid dispensing device, liquid flow establishing means, liquid metering means, an indicator, means connected to the meter and the indicator for moving the indicator away from initial position in accordance with the amount of liquid passing through the metering means, means for returning the indicator to initial position, and means common to the indicator moving and indicator returning means for successively actuating the same.

17. A dispensing pump having a hose support, a meter, a resettable indicator under control of the meter for indicating the amount of liquid dispensed, means for driving the indicator, a pump for supplying liquid to the meter, means operable in predetermined sequence to reset said indicator and thereafter to actuate said pump and drive said indicator under control of said meter, said means being actuated by movement of said hose support.

CHARLES S. HAZARD.

DISCLAIMER 2,109,352.—*Charles S. Hazard*, New York, N. Y. AUTOMATIC ZEROIZER FOR DISPENSING PUMP. Patent dated February 22, 1938. Disclaimer filed September 15, 1939, by the assignee, *Neptune Meter Company*.

Hereby enters this disclaimer to claims 4 and 16 in said specification.

[*Official Gazette October 10, 1939.*]